(12) United States Patent
Seely et al.

(10) Patent No.: US 10,469,395 B2
(45) Date of Patent: Nov. 5, 2019

(54) PACKET TRANSMISSION CREDIT ALLOCATION

(71) Applicant: Hewlett Packard Enterprise Development LP, Houston, TX (US)

(72) Inventors: Jonathan M. Seely, Roseville, CA (US); Mark Shillingburg, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/692,891

(22) Filed: Aug. 31, 2017

(65) Prior Publication Data

US 2019/0068515 A1 Feb. 28, 2019

(51) Int. Cl.
| | |
|---|---|
| *H04L 12/801* | (2013.01) |
| *H04L 12/861* | (2013.01) |
| *H04L 12/823* | (2013.01) |
| *H04L 12/721* | (2013.01) |
| *H04L 12/911* | (2013.01) |
| *H04L 12/26* | (2006.01) |

(52) U.S. Cl.
CPC .............. *H04L 47/39* (2013.01); *H04L 45/72* (2013.01); *H04L 47/32* (2013.01); *H04L 47/70* (2013.01); *H04L 49/9005* (2013.01); *H04L 43/16* (2013.01)

(58) Field of Classification Search
CPC ......... H04L 47/39; H04L 47/70; H04L 47/32; H04L 49/9005; H04L 45/72; H04L 43/16
See application file for complete search history.

(56) References Cited

U.S. PATENT DOCUMENTS

| | | | |
|---|---|---|---|
| 5,825,748 A | * 10/1998 | Barkey | ............... H04L 12/5602 370/236 |
| 7,191,255 B2 | 3/2007 | Wong et al. | |
| 8,295,293 B1 | 10/2012 | Brown et al. | |
| 2007/0121495 A1 | 5/2007 | Breti et al. | |
| 2011/0075555 A1 | 3/2011 | Ziegler | |

OTHER PUBLICATIONS

H.T. Kung, "Credit-Based Flow Control" Feb. 16, 2017, Harvard University, Available at: www.nap.edu/read/5769/chapter/4, 3 pages.

\* cited by examiner

*Primary Examiner* — Mohammad S Anwar
(74) *Attorney, Agent, or Firm* — Park, Vaughan, Fleming & Dowler LLC (57) ABSTRACT

Example implementations relate to packet transmission credit allocation. In some examples, a system may include a processing resource and a memory resource storing instructions executable by the processing resource to allocate a first amount of packet transmission credits from a destination node to a source node; determine a modification to the first amount of packet transmission credits allocated from the destination node to the source node based on a comparison of a quantity of redeemed packet transmission credits by the source node to a packet transmission credit threshold of the source node; adjust the modification based on a condition at a buffer associated with the destination node; and apply the adjusted modification to the first amount of packet transmission credits to produce a second amount of packet transmission credits to allocate from the destination node to the source node.

19 Claims, 3 Drawing Sheets

PACKET TRANSMISSION CREDIT ALLOCATION

BACKGROUND

A network may include a computing network for data transfer. A network may transfer data from a source node to a destination node. A network may have a fixed amount of bandwidth. A system to monitor and/or control the traffic of data across the network may be utilized.

DETAILED DESCRIPTION

A computing network may include a network for communicating data utilizing a digital telecommunications computing network to facilitate the sharing of data among nodes connected to the network. The nodes may include computing devices that share an interface with the network.

The nodes may be able to exchange data. The data may include packet flows made up of a sequence of packet data units sent from a source node to a destination node. Each data packet may include a formatted unit of data such as a list of bits or bytes to be carried by a packet-switched network. The data packets may include headers and payloads. The headers may be utilized by network devices such as routers and/or switched to direct the data packet to its destination.

The nodes connected via the shared interface to the packet-switched network may transmit packets to one another through data link channels between the nodes. The data link may employ a variety of link layer technologies. In some examples, the network may utilize an Ethernet link layer technology for communicating packets among nodes. The data link may include an interconnect fabric such as wired and/or wireless data link connecting nodes. The interconnect fabric may have a variety of distinct architectures to accomplish the network of connections. Portions of the interconnect fabric of the network may be contained within and/or connected to a network switch.

The network may utilize network switches to connect nodes and route packets between the nodes. A network switch may include a computing device that connects nodes, such as computing devices, together on the network by carrying out packet switching to receive, process, and forward data to nodes that are supposed to receive it instead of broadcasting the same data out to many nodes that are not the target of the data. The network switch may include an Ethernet network switch.

A data packet may be sent from a source node to a destination node across the interconnect fabric. The destination node may include a buffer for storing data packets that have arrived from the source node to await processing. A buffer at the destination node may include a fixed or otherwise limited amount of storage space.

The amount of data packet traffic being sent from source nodes to destination nodes over the interconnect fabric may be variable. For example, a packet-switched network may include a plurality of nodes. In some examples, multiple source nodes may attempt to send data packets to a single destination node. Further, data packet traffic levels within the network may be variable resulting in the source nodes attempting to send various amounts of data packets to the destination nodes.

Since the destination node has a limited amount of storage space available on its buffer and/or a limited capacity to process data packets, the destination node may not be able to take all the traffic that source nodes want to send to it. The result of too much data packet traffic and/or not enough buffer space may include dropped data packets, incomplete data flows, errors in the network, inability to meet quality of service standards, etc. Further, when the storage space available on the buffer of the destination node is not allocated in a manner that reflects the data packet transmission demands of a particular source or sources, then the data packet transmission from the source may needlessly suffer because it is being starved of buffer space that may not be otherwise utilized by other sources that the space may be allocated to.

In contrast, examples of the present disclosure may include systems, methods, and machine-readable media for packet transmission credit allocation. For example, a system may include a processing resource and a memory resource storing instructions executable by a processing resource. The instructions may be executable by the processing resource to allocate a first amount of packet transmission credits from a destination node to a source node; compare an amount of packet transmission credits received at the destination node from the source node to the first amount of packet transmission credits; and determine, based on the comparison and based on a limit of packet transmission credits assignable from the destination node, a modification to the first amount of packet transmission credits allocated to the source node.

Figure 1:
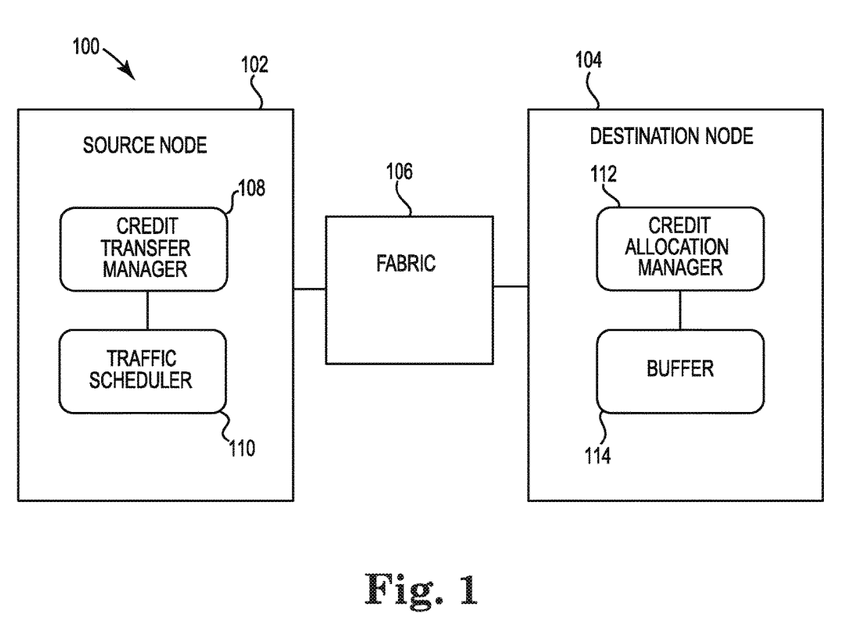
FIG. 1 illustrates an example of a system for packet transmission credit allocation consistent with the disclosure.

FIG. 1 illustrates an example system 100 for packet transmission credit allocation consistent with the disclosure. The system 100 may include a source node 102. The source node 102 may include a computing device that is originating and/or communicating a packet flow to send to a destination node 104. The source node 102 may include an external network that is originating and/or communicating a packet flow to send to a destination network. The source node 102 may include an ingress port. For example, the source node 102 may include a physical and/or virtual port or interface of a network router or network switch that accepts network traffic. The source node 102 may include the portion of a computer network comprising an incoming port for a packet flow entering a packet-switched computing network.

The system 100 may include a destination node 104. The destination node 104 may include a computing device that is a targeted end destination or targeted intermediate destination of a packet flow coming from the source node 102. The destination node 104 may include a portion of a local computing network that is receiving and/or forwarding a packet flow to send to a targeted destination. The destination node 104 may include an egress port. For example, the destination node 104 may include a physical and/or virtual port or interface of a network router or network switch where network traffic exits the local network to another network or to a final destination node 104. The destination node 104 may include the portion of a computer network comprising an exiting port for a packet flow from a packet-switched computing network.

The system 100 may include an interconnect fabric 106. The interconnect fabric 106 may include a connection and/or packet flow traffic path and/or paths between the source node 102 and the destination node 104. The fabric 106 may include a crossbar fabric and/or multiple crossbar fabrics offering traffic paths between the source node 102 and the destination node 104. The fabric 106 may include one or a plurality of various topologies and various buffering and traffic engineering systems (e.g., ad hoc, virtual output queueing, etc.). The fabric may include a switched fabric in which network nodes interconnect via one or more network switches. A switched fabric network topology may interconnect nodes via one or more network switches such as crossbar switches and may spread network traffic across multiple physical links. The fabric 106 may include Ethernet fabric. An Ethernet fabric may include network topologies utilized in local area networks (LAN), wide area networks (WAN), etc. Ethernet fabric may use twisted pair and or fiber optic links in conjunction with hubs or switches to transfer data among attached nodes.

The system 100 may include a lightly buffered switch, such as a switch including relatively limited amounts of storage space on buffers associated with the source node 102 and the destination node 104. That is, the system 100 may not have enough storage space at buffers to provide storage space at the destination node 104 for every source node 102 in the system 100. In other words, the system 100 may have a finite amount of storage space at buffers such as buffer 114. Buffer 114 may include a storage buffer 114 at and/or associated with the destination node 104. The buffer 114 may include storage space to store packet flows being communicated from the source node 102 to the destination node 104 across the fabric 106. The buffer 114 may temporarily store packets sent from a source node 102 and/or a plurality of source nodes while they await further processing and/or communication.

The system 100 may be utilized to control the admission of packets being sent from the source node 102 to the destination node 104 across the fabric 106. That is, the system may be utilized to control the packet flows from the source node 102 to the destination node 104 by preventing or authorizing the sending of the packet flows from the source node 102 to the destination node 104 across the fabric 106. The system 100 may be utilized to ensure that there is enough storage space available at the buffer 114 to accommodate the packet flow traffic before it is sent and to ensure that the source node 102 has enough storage space reserved at the buffer to accommodate its present and future packet flow traffic load destined for the destination node 104. The system 100 may accomplish these ends while preserving access to storage space on the buffer 114 for other source nodes and/or packet flows. The system 100 may remain adaptive to changing packet flow traffic loads and/or network conditions by adjusting reserved storage space accordingly through the use of a packet transmission credit accounting system described herein.

The system 100 may include a credit allocation manager 112. The credit allocation manager 112 may operate based on instructions. For example, the credit allocation manager 112 may utilize a processing resource to execute machine-readable instructions stored on a machine-readable media to cause the processing resource to perform actions and/or functions associated with administrating a packet transmission credit accounting system as described herein. In an example, administrating a packet transmission credit accounting system may be supported with a processing resource executing instructions from firmware of an Ethernet switch.

In other examples, the credit allocation manager 112 may include logic. As used herein, "logic" may be an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in a memory and executable by a processor. It is presumed that logic similarly executes instructions for purposes of the embodiments of the present disclosure. In an example, administrating a packet transmission credit accounting system may be supported with logic.

In some examples, the credit allocation manager 112 may include a combination of logic and machine-readable instructions stored on a machine-readable media to cause a processing resource to perform actions and/or functions associated with administrating a packet transmission credit accounting system. The credit allocation manager 112 may be local to the destination node 104. That is, the logic, machine-readable instructions, and/or combination thereof may be located on the destination node 104. In some examples, the credit allocation manager 112 may be located on a local network including a plurality of destination nodes and the credit allocation manager 112 may administer the packet transmission credit accounting system for each of the plurality of destination nodes 104.

The credit allocation manager 112 may maintain a packet transmission credit allocation limit for each source node 102 of a plurality of source nodes in communication with the destination node 104. The allocation limit may include a limit of packet transmission credits allocable from the destination node 104 to the source node 102. A packet transmission credit may include a permission allocated to a source node 102 from a destination node 104 to communicate an amount of data to the destination node 104. The packet transmission credit may correspond to a reserved amount or portion of storage space on a buffer 114 of the destination node 104 that may be utilized to accept and/or store a packet communicated from the source node 102 to the destination node 104. The source node 102 may redeem a packet transmission credit with the credit allocation manager 112 when it sends an amount of data, such as an amount of data associated with a packet flow, to the destination node 104 and/or the buffer 114.

Upon redemption of the packet transmission credit, the packet transmission credit and/or the corresponding reserved amount or portion of storage space on a buffer 114 of the destination node 104 may be conceptually "back" with the credit allocation manager 112 and be available for reallocation to a same or different source node 102. For example, the packet transmission credit may represent a reservation of storage space on the buffer 114 and the redemption of the packet transmission credit may serve to return the reservation and/or the ability to reassign the reservation "back" to the credit allocation manager 112. Stated differently, the credit allocation manager 112 may be unable to assign a portion of the storage space on the buffer 114 that is already reserved as evidenced by the issuance by the credit allocation manager 112 of a corresponding packet transmission credit. The credit allocation manager 112 may, however, reassign the portion of the storage space to a different source node 102 once the packet transmission credit corresponding to that portion has been redeemed and is thus "back" with the credit allocation manager 112 available for a new allocation.

The above mentioned allocation limit, therefore, may include a limit on the amount of packet transmission credits that may be allocated to each source node 102 of a plurality of source nodes in communication with the destination node 104. The allocation limit may be based on a theoretical limit determined based on a largest amount of storage space that may be reserved for each of the plurality of source nodes at the buffer 114. In some examples, the allocation limit may be a configurable setting determined and/or received from a network administrator.

In some examples, the allocation limit may be a static largest amount of packet transmission credits allocable to each source node 102 of the plurality of source nodes. That is, the limit on the amount of packet transmission credits that may be allocated to each source node 102 may not change along with and/or in response to changing amounts of packet transmission credits allocated to and/or redeemed by various source nodes.

The credit allocation manager 112 may maintain a packet transmission credit baseline for each source node 102 of a plurality of source nodes in communication with the destination node 104. The packet transmission credit baseline may include a smallest amount of packet transmission credits allocable to each source node 102 of the plurality of source nodes from the destination node 104. That is, the packet transmission credit baseline may include a smallest amount or portion of storage space on a buffer 114 that is reserved for data from each source node 102. As such, the amount of packet transmission credits allocated, to be allocated, and/or allocable to each source node 102 of the plurality of source nodes in communication with the destination node 104 may not be allowed, by the credit allocation manager 112, to fall below the amount specified by the packet transmission credit baseline. Alternatively, the amount of packet transmission credits allocated, to be allocated, and/or allocable to each source node 102 of the plurality of source nodes in communication with the destination node 104 may be allowed, by the credit allocation manager 112, to fall below the amount specified by the packet transmission credit baseline for a limited period of time before being raised back above the baseline amount.

The packet transmission credit baseline may be based on a theoretical limit determined based on a smallest amount of storage space that may be reserved for each of the plurality of source nodes at the buffer 114 in order to allow each source node 102 of the plurality of source nodes to send a relatively small amount of traffic initially to the destination node 104. In some examples, the packet transmission credit baseline may be a configurable setting determined and/or received from a network administrator.

In some examples, the packet transmission credit baseline may be a static smallest amount of packet transmission credits allocated to each source node 102 of the plurality of source nodes. That is, the limit on the smallest amount of packet transmission credits that may be allocated to each source node 102 may not change along with and/or in response to changing amounts of packet transmission credits allocated to and/or redeemed by various source nodes.

In contrast to systems that rely on a source node inquiring of a destination node whether it has space on its buffer to accept a packet it is preparing to send to the destination node and then basing the send/don't send decision on the yes/no response from the destination node 104, the present system may utilize the packet transmission credit baseline. The packet transmission credit baseline may ensure that each source node 102 of the plurality of source nodes has been pre-allocated a small amount of space on the buffer 114 such that the source node 102 may send some amount of traffic initially. As will become apparent later in this description, the system 100 may then make assumptions regarding whether a source node 102 has additional data to send to the destination 104 and adjust the amount of packet transmission credits allocated thereto. In this manner, system 100 bandwidth and/or space on the fabric 106 may be preserved by eliminating the request and reply messages. Further, the system 100 may allow the source node 102 to have a reduced amount and/or utilization of buffer space at the node 102 to hold on to packet flows while the source node 102 sends requests and/or waits for replies and/or arrival confirmations.

The packet transmission credits may be drawn from a fixed pool of packet transmission credits associated with a particular destination node 104. That is, each destination node 104 may have a fixed number of packet transmission credits to allocate and/or introduce into circulation within the described packet transmission credit accounting system. Since the amount of storage space available on a buffer 114 associated with the destination node 104 is fixed, it may follow that the pool of packet transmission credits representing that storage space would also be fixed in amount. The described packet transmission credit allocation limit and packet transmission credit baseline may limit the largest and smallest amount of allocable packet transmission credits, respectively, that may be allocated from the fixed pool of packet transmission credits.

The credit allocation manager 112 may allocate a first amount of packet transmission credits from a destination node 104 to a source node 102. Allocating the first amount of packet transmission credits from the destination node 104 to the source node 102 may include sending the packet transmission credits to and/or receiving the packet transmission credits at a credit transfer manager 108. The credit transfer manager 108 may be separate from or a portion of the credit allocation manager 112.

The credit transfer manager 108 may operate based on instructions. For example, the credit transfer manager 108 may utilize a processing resource to execute machine-readable instructions stored on a machine-readable media to cause the processing resource to perform actions and/or functions associated with administrating a packet transmission credit accounting system as described herein. In an example, administrating a packet transmission credit accounting system may be supported with a processing resource executing instructions from firmware of an Ethernet switch.

In other examples, the credit transfer manager 108 may include logic. As used herein, "logic" may be an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in a memory and executable by a processor. It is presumed that logic similarly executes instructions for purposes of the embodiments of the present disclosure. In an example, administrating a packet transmission credit accounting system may be supported with logic.

In some examples, the credit transfer manager 108 may include a combination of logic and machine-readable instructions stored on a machine-readable media to cause a processing resource to perform actions and/or functions associated with administrating a packet transmission credit accounting system. The credit transfer manager 108 may be local to the source node 102. That is, the logic, machine-readable instructions, and/or combination thereof may be located on the source node 102. In some examples, the credit transfer manager 108 may be located on an external network including a plurality of source nodes and the credit transfer manager 108 may administer the packet transmission credit accounting system for each of the plurality of source nodes.

The packet transmission credits may be allocated to the credit transfer manager 108 in charge of administering the packet transmission credit accounting system for a particular source node 102. The packet transmission credits allocated may be allocated to the particular source node 102 in the sense that they are assigned to the source node 102 and are redeemable by the source node 102 to send packet flows from the source node 102 to the destination node 104.

In some examples, the credit transfer manager 108 may provide some centralized administration of the packet transmission credit accounting system for a portion of the plurality of nodes. That is, the credit transfer manager 108 may monitor, compile, and/or manage packet transmission credits for a plurality of source nodes, all the while maintaining the source node specificity of each packet transmission credit received from a destination node 104.

The first amount of packet transmission credits allocated from the destination node 104 to the source node 102 may be the packet transmission credit baseline amount. In an example, the first amount of packet transmission credits may be an initial allocation from the destination node 104 to a source node 102 allocating the configured smallest allocable amount of packet transmission credits to the source node 102. In another example, the first amount of packet transmission credits may not be an initial allocation from the destination node 104 to a source node 102, but rather may be an allocation occurring subsequent to the initial allocation. As such, the first amount of packet transmission credits may be an amount of packet transmission credits other than the packet transmission credit baseline amount.

The destination node 104 and/or the credit allocation manager 112 associated with the destination node 104 may track and retain the first amount of packet transmission credits allocated from the destination node 104 to the source node 102. That is, the destination node 104 may keep a tally of the first amount of packet transmission credits allocated to the source node 102 for use in subsequent comparisons and determinations.

The destination node 104 and/or the credit allocation manager 112 associated with the destination node 104 may receive and/or monitor the amount of packet transmission credits redeemed by each source node 102 of the plurality of source nodes. As described above, a source node 102 may redeem a packet transmission credit by sending an amount of data permitted by the packet transmission credit to the destination node 104. As such, the amount of packet transmission credits redeemed by the source node 102 may be determined based on the amount of data sent from the source node 102 to the destination node 104. Alternatively, the amount of packet transmission credits redeemed by the source node 102 may be monitored by, determined by, and/or received from the credit transfer manager 108.

In some examples, the redemption of the credit by the source node 102 may be logged in the credit allocation manager 112 such that a packet transmission credit that was allocated from the destination node 104 to the source node 102 may be said to have been received back at the destination node 112. As such, the destination node 104 and/or the credit allocation manager 112 associated with the destination node 104 may keep track of both the amount of packet transmission credits allocated to the source node 102 and the amount of those packet transmission credits redeemed by the source node 102. The amount of packet transmission credits allocated to the source node 102 and the amount of those packet transmission credits redeemed by the source node 102 may be the amount of packet transmission credits allocated to the source node 102 and the amount of those packet transmission credits redeemed by the source node 102 since a last replenishing cycle when packet transmission credits were last allocated from the destination node 104 to the source node 102. As used herein a replenishing cycle may include a series of operations performed periodically within the system 100. Specifically, a replenishing cycle may include operations described herein for determining the second amount of packet transmission credits to allocate from the destination node 104 to the source node 102. The end of a particular replenishing cycle may be marked by the allocation of the second amount of packet transmission credits from the destination node 104 to the source node 102. The replenishing cycle may, therefore, be a series of operations associated with replenishing a pool of packet transmission credits assigned to and redeemable by the source node 102 in order to prevent credit starvation at the source node 102.

The destination node 104 and/or the credit allocation manager 112 associated with the destination node 104 may compare the amount of packet transmission credits redeemed by the source node 102 to a credit threshold. The credit threshold may be determined based on the first amount of packet transmission credits allocated to the source node 102.

In an example, the first amount of packet transmission credits allocated from the destination node 104 to the source node 102 may not have been allocated in a single allocation event. Instead, in some examples the first amount of packet transmission credits allocated to the source node 102 may be an amount of packet transmission credits allocated to the source node 102 over successive allocations to and/or redemptions by the source node 102. To provide illustrative examples, the first amount of packet transmission credits allocated from a destination node 104 to the source node 102 may include a single allocation from the destination node 104 to the source node 102 of five credits resulting in a first amount of packet transmission credits allocated from a destination node 104 to the source node 102 of five credits. In a contrasting example, the first amount of packet transmission credits allocated from a destination node 104 to the source node 102 may include an allocation to the source node 102 of two credits, followed by a redemption of one credit by the source node, followed by an allocation to the source node 102 of an additional four credits resulting in a first amount of packet transmission credits allocated from a destination node 104 to the source node 102 of five credits.

Comparing the redeemed amount of the allocated first amount of packet transmission credits to the credit threshold may include determining the packet transmission credit threshold. Determining the packet transmission credit threshold may include determining one or more of a packet transmission credit increment threshold and/or a packet transmission decrement threshold relative to the allocated first amount of packet transmission credits. A packet transmission increment threshold may include a threshold value and/or range of values of packet transmission credits redeemed by the source node 102 that will trigger an increase in the amount of packet transmission credits allocated to the source node 102 in a subsequent allocation. A packet transmission decrement threshold may include a threshold value and/or range of values of packet transmission credits redeemed by the source node 102 that will trigger a decrease in the amount of packet transmission credits allocated to the source node 102 in a subsequent allocation.

The packet transmission increment threshold may be determined relative to the first amount of packet transmission credits allocated to the source node 102. For example, the packet transmission increment threshold may be defined based on a delta percentage from the first amount of packet transmission credits allocated to the source node 102. That is, the packet transmission increment threshold may be determined to be a threshold value or range of values of packet transmission credits redeemed by the source node 102 that falls within, for example, twenty percent difference from the first amount of packet transmission credits allocated to the source node 102. The packet transmission increment threshold may be determined by means other than a delta percentage. For example, the packet transmission increment threshold may be determined by fixed amounts of packet transmission credits above or below a given from the first amount of packet transmission credits allocated to the source node 102. However, the defining the increment thresholds by percentage differences may facilitate a uniform scaling of the thresholds to the various amounts of packet transmission credits allocated to the source node 102 throughout successive applications of the system 100.

The packet transmission decrement threshold may be determined relative to the packet transmission increment threshold. That is, the packet transmission decrement threshold may be defined as a threshold value or range of values of packet transmission credits redeemed by the source node 102 that falls below the twenty percent difference from the first amount of packet transmission credits allocated to the source node 102 that defines the packet transmission increment threshold.

Comparing the amount of the allocated packet transmission credits redeemed by the source node 102 to the packet transmission credit threshold may include determining whether the amount of the allocated packet transmission credits redeemed by the source node 102 is within a window of values defining the packet transmission increment threshold and/or below the window of values defining the packet transmission increment threshold. Additionally, comparing the amount of the allocated packet transmission credits redeemed by the source node 102 to the packet transmission credit threshold may include determining whether the amount of the allocated packet transmission credits redeemed by the source node 102 is within a window of values defining the packet transmission increment threshold.

Determining the packet transmission credit threshold may include determining a plurality of increment levels. The increment levels may be a series of levels making up a continuous scale of levels. Each increment level may correspond to a range of redeemed packet transmission credit amounts. For example, each increment level may make up a portion of a scale of redeemed packet transmission credit amounts, the scale spanning from no redeemed packet transmission credits to an amount of redeemed packet transmission credits equal to the packet transmission credit allocation limit. Each increment level may be defined by a lower threshold redeemed packet transmission credit amount and an upper threshold redeemed packet transmission credit amount. As such, determining the packet transmission credit threshold value may include determining the lower threshold redeemed packet transmission credit amount and an upper threshold redeemed packet transmission credit amount associated with each of the plurality of increment levels.

Determining the packet transmission credit threshold may include determining a plurality of decrement levels. The decrement levels may be a series of levels making up a continuous scale of levels. Each decrement level may correspond to a range of redeemed packet transmission credit amounts. For example, each decrement level may make up a portion of a scale of redeemed packet transmission credit amounts, the scale spanning from no redeemed packet transmission credits to an amount of redeemed packet transmission credits equal to the packet transmission credit allocation limit. Each decrement level may be defined by a lower threshold redeemed packet transmission credit amount and an upper threshold redeemed packet transmission credit amount. As such, determining the packet transmission credit threshold value may include determining the lower threshold redeemed packet transmission credit amount and an upper threshold redeemed packet transmission credit amount associated with each of the plurality of decrement levels. The scale of decrement levels may cover the same overall range as the scale of increment levels, but the decrement level for a particular redeemed packet transmission level may be a different and/or distinct level than the increment level. That is, there may be no correlation between the lower threshold redeemed packet transmission credit amount and an upper threshold redeemed packet transmission credit amount associated with the decrement levels and the increment levels.

Comparing the amount of the allocated packet transmission credits redeemed by the source 102 to the packet transmission credit threshold may include determining which increment level or decrement level the amount of the allocated packet transmission credits redeemed by the source 102 falls within. Determining the increment level or decrement level of the amount of allocated packet transmission credits redeemed by the source 102 may include comparing the amount of the allocated packet transmission credits redeemed by the source node 102 to the lower threshold redeemed packet transmission credit amount and an upper threshold redeemed packet transmission credit amount associated with each of the decrement levels or each of the increment levels.

In an example, the amount of the allocated packet transmission credits redeemed by the source 102 may be compared to the threshold levels defining just the increment levels. In another example, the amount of the allocated packet transmission credits redeemed by the source 102 may be compared to the threshold levels defining just the decrement levels. Whether the amount of the allocated packet transmission credits redeemed by the source node 102 is compared to the threshold levels defining just the increment levels or just the decrement levels may be determined based on the comparison and subsequent determination of whether the allocated packet transmission credits redeemed by the source 102 fall within a window of values defining the packet transmission increment threshold or within a window of values defining the packet transmission decrement threshold. For example, if the allocated packet transmission credits redeemed by the source node 102 fall within a window of values defining the packet transmission increment threshold then the allocated packet transmission credits redeemed by the source node 102 may be compared to the threshold levels defining just the increment levels. Conversely, if the allocated packet transmission credits redeemed by the source node 102 fall within a window of values defining the packet transmission decrement threshold then the allocated packet transmission credits redeemed by the source node 102 may be compared to the threshold levels defining just the decrement levels. The increment level or decrement level that the allocated packet transmission credits redeemed by the source node 102 fall within may be determined based on the comparison.

The credit allocation manager 112 may determine a modification to the first amount of packet transmission credits allocated to the source node 102. The modification to the first amount of packet transmission credits allocated to the source node 102 may include determining a modification to apply to the first amount of packet transmission credits allocated to the source node 102 to yield a second amount of packet transmission credits to be allocated to the source node 102 in a subsequent packet transmission credit allocation. The modification to apply to the first amount of packet transmission credits allocated to the source node 102 may be a modification determined to meet the future needs of the source node 102 and the system 100 overall. For example, the first amount of packet transmission credits allocated to the source node 102 may be a modification determined to provide a source node 102, demonstrating a capacity to consume increased packet transmission bandwidth and/or storage capacity on buffer 114, with a correspondingly increased amount of packet transmission credits. Likewise, the first amount of packet transmission credits allocated to the source node 102 may be a modification determined to provide a source node 102, demonstrating a diminished capacity to consume packet transmission bandwidth and/or storage capacity on buffer 114, with a correspondingly decreased amount of packet transmission credits.

The modification to the first amount of packet transmission credits allocated to the source node 102 may be based on the comparison of the amount of the first amount of packet transmission credits redeemed by the source node 102 to the packet transmission credit threshold.

For example, if the amount of the allocated packet transmission credits redeemed by the source node 102 is within the packet transmission increment threshold, then the credit allocation manager 112 may determine that the modification should include an increase to the amount of packet transmission credits allocated to the source node 102 in a subsequent allocation of packet transmission credits from the destination node 104 to the source node 102. That is, since the source node 102 redeemed an amount of its allocated packet transmission credits that is within a delta percentage of the full amount of its allocated packet transmission credits, the credit allocation manager 112 may assume that the source node 102 has more data to send. If the source node 102 has more data to send it may be able to utilize more storage space on the buffer 114 of the destination node 104, thereby delivering more of the data. As such, the assumption that the source node 102 has more data to send in subsequent transmissions may warrant an increase in the amount of packet transmission credits allocated to the source node 102 in a subsequent allocation (e.g., a credit replenishment cycle occurring after a period of time since a previous allocation) so that the source node 102 has more packet transmission credits redeemable to send more data in a subsequent transmission.

If, however, the amount of the allocated packet transmission credits redeemed by the source node 102 is within the packet transmission decrement threshold, then the credit allocation manager 112 may determine that the modification should include a decrease to the amount of packet transmission credits allocated to the source node 102 in a subsequent allocation of packet transmission credits from the destination node 104 to the source node 102. That is, since the source node 102 failed to redeem an amount of its allocated packet transmission credits that is within a delta percentage of the full amount of its allocated packet transmission credits, the credit allocation manager 112 may make an assumption. The assumption may include that the source node 102 does not have more data to send. The assumption may include that the source node 102 may utilize less storage space on the buffer 114 of the destination node 104 and still satisfy its data delivery demands. These assumptions may warrant a decrease in the amount of packet transmission credits allocated to the source node 102 in a subsequent allocation (e.g., a credit replenishment cycle occurring after a period of time since a previous allocation).

As described above, a portion of the comparison of the redeemed amount of packet transmission credits to the packet transmission credit threshold may yield a determination of whether the modification should include an increase or decrease to the first amount of packet transmission credits allocated from the destination node 104 to the source node 102. Additionally, a portion of the comparison of the redeemed amount of packet transmission credits to the packet transmission credit threshold may yield a determination of an amount of packet transmission credits by which to increase or decrease the first amount of packet transmission credits.

The amount of increase or decrease of the first amount of packet transmission credits may be determined based on an increment level or decrement level that the amount of redeemed allocated packet transmission credits falls within. Each increment level may define a base amount of packet transmission credits to increment the first amount of packet transmission credits by. The base amount of packet transmission credits to increase the first amount of packet transmission credits by may taper or decrease as the increment level corresponding to the redeemed packet transmission credit amount increases and approaches the packet transmission credit allocation limit. For example, the greater the amount of redeemed packet transmission credits, the greater the corresponding increment level may be. However, the greater the increment level, the less the base amount of packet transmission credits associated therewith since the greater increment level may correspond to a decreased margin between the allocated first amount of packet transmission credits and the packet transmission credit allocation limit.

Each decrement level may define a base amount of packet transmission credits to decrement the first amount of packet transmission credits by. The base amount of packet transmission credits to decrease the first amount of packet transmission credits by may be substantially uniform across the range of redeemed packet transmission values spanning from the packet transmission credit allocation limit to the baseline amount of packet transmission credits.

The amount of increase or decrease defined by each increment or decrement level may be determined relative to the packet transmission credit allocation limit and/or relative to the baseline amount of packet transmission credits. For example, the scale of increment or decrement levels corresponding to the redeemed packet transmission credits may be fit within the scale of packet transmission credit values spanning from the packet transmission credit allocation limit to the baseline amount of packet transmission credits. The scale of the increment and decrement levels may be adjusted based on adjustments to the packet transmission credit allocation limit and/or the baseline amount of packet transmission credits.

The modification to the first amount of packet transmission credits allocated to the source node 102 may be adjusted. For example, the base amount of packet transmission credits to increase or decrease the first amount by as determined from the increment level or decrement level, respectively may be adjusted. Adjusting the base amount may include adjusting the base amount based on a condition at the buffer 114 associated with the destination node 104. A condition at the buffer 114 may, for example, include a congestion level at the buffer 114, an amount of storage space remaining or occupied at the buffer 114, a rate of change of the amount of storage space remaining or occupied at the buffer 114, and/or other states of the buffer 114 that may indicate an ability or a trend in an ability of the buffer 114 to provide additional storage space for handling traffic associated with the destination node 104. For example, adjusting the base amount may include determining a condition, such as a congestion level at the buffer 114. For example, the amount of storage space remaining and/or occupied at the buffer 114 may be determined. The amount of storage space remaining and/or occupied at the buffer 114 may be compared to one or more threshold amount of storage space remaining and/or occupied at the buffer 114. In an example, various threshold amounts of storage space remaining and/or occupied at the buffer 114 may correspond to various congestion levels at the buffer 114.

Once a congestion level has been identified for the buffer 114, a corresponding adjustment to the base amount of packet transmission credits to increase or decrease the first amount by may be determined based on the identified congestion level. For example, the base amount of packet transmission credits to increase or decrease the first amount by may be scaled based on the congestion level. For example, if it is determined that the buffer 114 has ninety-five percent capacity available and/or unused, then the base amount of packet transmission credits to increase the first amount by may be scaled up and/or the base amount of packet transmission credits to decrease the first amount by may be scaled down since congestion at the buffer 114 is relatively low and the buffer 114 may be under-utilized. Alternatively, if it is determined that the buffer 114 has five percent capacity available and/or unused, then the base amount of packet transmission credits to increase the first amount by may be scaled down and/or the base amount of packet transmission credits to decrease the first amount by may be scaled up since congestion at the buffer 114 is relatively high and the buffer 114 may be being approaching over-capacity. As such, the system 100 may be more generous in allocating storage space on the buffer of the destination node 104 when such storage space is freely available in relatively large amounts. Conversely, the system 100 may be more cautious allocating storage space on the buffer of the destination node 104 when such storage space is relatively scarce. In some examples, if the redeemed amount of packet transmission credits is determined to be within the decrement window, then the base amount of packet transmission credits to reduce the first allocated amount by may not be adjusted.

Adjusting the base amount based on a condition at the buffer 114 associated with the destination node 104 may provide the system 100 with the ability to adjust the packet transmission credit allocation to a specific source node based on the overall state of a common resource in the system 100. As described above, the system 100 may include a plurality of source nodes in communication with the destination node 104. The plurality of source nodes may be utilizing a common limited resource of the storage space on the buffer 114 of the destination node 104. That is, each of the plurality of source nodes, including the particular source node 102, may be sending packet flows to the destination node 104 that are occupying storage space on the buffer 114. A system 100 that simply allocated packet transmission credits with singular regard to the allocation and redemption of packet transmission credits at a single source node 102 and without regard to utilization of the common resource buffer 114 by other source nodes may not be able to predict and adapt to changing network conditions. The plurality of source nodes communicating with the buffer 114 may affect the conditions at the buffer 114. As such, considering the conditions at the buffer 114 may include considering the activity of the other source nodes communicating with the destination node 104.

From the adjustment to the base amount of packet transmission credits to increase or decrease the first amount, a second amount of packet transmission credits may be determined. The second amount of packet transmission credits may be an amount of packet transmission credits that are allocated to the source node 102 during a second allocation completing a credit replenishment cycle. The second amount of packet transmission credits may be determined based on the first amount of packet transmission credits allocated from the destination node 104 to the source node 102 and the adjusted base amount of packet transmission credits to increase or decrease the first amount by. The adjusted modification to the first amount of packet transmission credits allocated from the destination node 104 to the source node 102 may be applied to the first amount of packet transmission credits allocated from the destination node 104 to the source node 102 to yield the second amount of packet transmission credits to allocate from the destination node 104 to the source node 102. That is, the credit allocation manager 112 may add the adjusted base amount of packet transmission credits to the first amount of packet transmission credits allocated from the destination node 104 to the source node 102 if in the redeemed packet transmission credits were determined to be within the increment window. Alternatively, the credit allocation manager 112 may subtract the adjusted base amount of packet transmission credits from the first amount of packet transmission credits allocated from the destination node 104 to the source node 102 if in the redeemed packet transmission credits were determined to be within the decrement window.

In some examples, the base amount of packet transmission credits may not be adjusted. In such examples, the unadjusted base amount of packet transmission credits may be added to or subtracted from the first amount of packet transmission credits allocated from the destination node 104 to the source node 102.

If the resulting second amount of packet transmission credits would be below the packet transmission credit baseline, then the second amount of packet transmission credits may be adjusted. For example, the second amount of packet transmission credits may be adjusted so that it is at least at the packet transmission credit baseline.

Since the second amount of packet transmission credits may represent a total amount that a destination node 104 may allocate to a source node 102, the credit allocation manager 112 may adjust the second amount of packet transmission credits based on an amount of outstanding and/or unredeemed packet transmission credits allocated to the source node 102. As such, the amount of outstanding and/or unredeemed packet transmission credits allocated to the source node 102 from the destination node 104 may be calculated by subtracting the amount of the first amount of packet transmission credits allocated to the source node 102 from the destination node 104 that have been redeemed by the source node 102 from the total first amount of packet transmission credits allocated from the destination node 104 to the source node 102. Subsequently, the amount of outstanding and/or unredeemed packet transmission credits allocated to the source node 102 from the destination node 104 may be subtracted from the second amount of packet transmission credits yielding a final adjusted second amount of packet transmission credits to be allocated to the source node 102 from the destination node 104 during a subsequent second allocation.

The credit allocation manager 112 may send the final adjusted second amount of packet transmission credits for the source node 102 to a credit transfer manager 108. As mentioned above, the credit transfer manager 108 may not be located at or on a specific source node 102 despite being illustrated as such. The credit transfer manager 108 may receive and/or store the final adjusted second amount of packet transmission credits for the source node 102. The final adjusted second amount of packet transmission credits for the source node 102 may be added to the source node's 102 outstanding and/or unredeemed packet transmission credits remaining from the first allocation.

A source node 102 may utilize a traffic scheduler 110 to schedule and/or execute the transmission of packet flow traffic from the source node 102 to a destination node 104. When a source node 102 wants to send packet flow traffic to the destination node 104 the traffic scheduler 110 may issue a request to the credit transfer manager 108. The request may include an identification of the destination node 104 and an amount of packet transmission credits that it wants to consume in transmitting the packet flow traffic to the destination node 104.

The credit transfer manager 108 may check its repository of packet transmission credits allocated to the requesting source node 102 from the destination node 104 identified in the request. If the source node 102 has enough stored packet transmission credits allocated from the destination node 104 to send the packet flow transfer then the credit transfer manager 108 may grant permission to the traffic scheduler 110 of the source node 102 to proceed with transmitting the packet flow from the source node 102 to the destination node 104, redeeming the corresponding amount of packet transmission credits with the credit allocation manager 112 in the process. If, however, the source node 102 does not have enough stored packet transmission credits allocated from the destination node 104 to send the packet flow transfer then the credit transfer manager 108 may deny permission to the traffic scheduler 110 of the source node 102 to proceed with transmitting the packet flow from the source node 102 to the destination node 104 and the packet flow may be dropped at the source node 102, sent to another destination node, or held until the source node has been allocated enough packet transmission credits to cover the transmission in a subsequent allocation.

The credit transfer manager 108 may refund, to the destination node 104 from the source node 102, a portion of the first amount of packet transmission credits allocated to the source node 102 from the destination node 104. For example, responsive to a determination that the source node 102 has remained idle for a period of time, the credit transfer manager 108 may return any of the unredeemed packet transmission credits allocated to the source node 102 back to the destination node 104 whence they were allocated. A source node 102 may be determined to be idle when it has failed to transmit or attempt to transmit at least a threshold amount of data to a destination node 104.

The system 100 may be utilized to engineer network traffic in a lossless networking system. The system 100 may ensure that data makes it to a destination node 104 without being discarded. The system 100 may be utilized in a lightly buffered system that does not have the memory resources available to allocate a large portion of packet transmission credits to each of a plurality of source nodes 102 in communication with the destination node. Instead, the system 100 may start each of a plurality of source nodes out with an initial baseline allocation of packet transmission credits and then ramp up or wind down the amount of packet transmission credits allocated to particular source nodes. That is, the amount of packet transmission credits allocated to a source node 102 may be dynamically adapted based on source node-specific packet transmission credit utilization, source node-specific predictions of packet transmission credit demand, and a substantially real-time or current status of a resource such as storage capacity at a buffer 114 shared among the plurality of source nodes. The system 100 may allow for a source node-specific biasing of packet transmission credit allocation. Further, since the system 100 includes shared resources, the packet transmission credits may be considered a closed loop system with a fixed overall amount of credits, corresponding to the fixed amount of the shared resource, to be allocated, redeemed, reallocated, refunded, and/or otherwise distributed amount a plurality of source nodes. In contrast to providing a full allocation of available packet transmission credits, which can immediately exhaust the pool of credits and may result in an inefficient allocation of the credits, the system 100 may start with a least amount of packet transmission credits allocated to each source node and may increase in response to the amount of traffic received from a source node 102 while also considering the overall congestion rate at the buffer 114.

Figure 2:
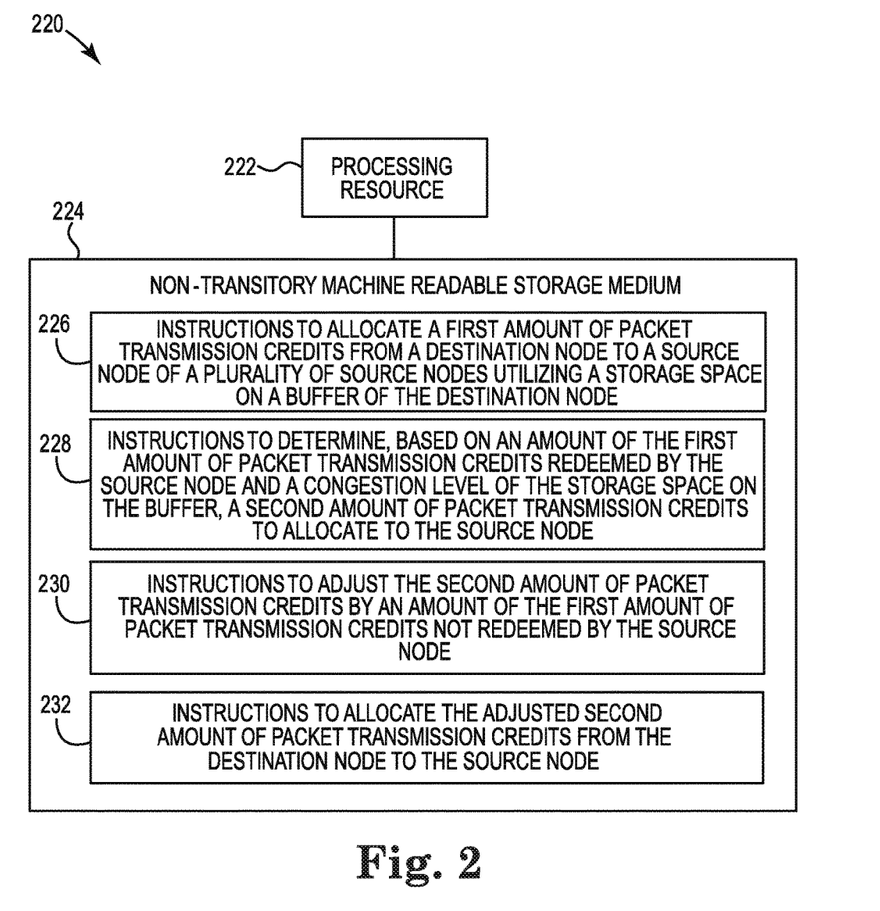
FIG. 2 illustrates a diagram of an example of a processing resource and a non-transitory computer readable medium for packet transmission credit allocation consistent with the disclosure.

FIG. 2 illustrates a diagram 220 of an example of a processing resource 222 and a non-transitory machine readable medium 224 for packet transmission credit allocation consistent with the disclosure. A memory resource, such as the non-transitory machine readable medium 224, may be used to store instructions (e.g., 226, 228, 230, 232) executed by the processing resource 222 to perform the operations as described herein. A processing resource 222 may execute the instructions stored on the non-transitory machine readable medium 224. The non-transitory machine readable medium 224 may be any type of volatile or non-volatile memory or storage, such as random access memory (RAM), flash memory, read-only memory (ROM), storage volumes, a hard disk, or a combination thereof.

The example medium 224 may store instructions 226 executable by the processing resource 222 to allocate a first amount of packet transmission credits from a destination node to a source node of a plurality of source nodes. In some examples the same first amount of packet transmission credits may be allocated to teach of the plurality of source nodes. For example, a first amount of packet transmission credits may include a baseline smallest amount of packet transmission credits allocated to all of the plurality of sources in communication with the destination node.

The plurality of source nodes may include a plurality of source nodes that are in communication with the destination node across a packet-switched network. Each of the plurality of source nodes may communicate packet flows to the destination node. As such, each of the plurality of source nodes may utilize a portion of a storage space on a buffer of the destination node. Since the storage space on the buffer of the destination node may be utilized to store packets sent to the destination during scheduling of the packets for egress, each of the plurality of sources may utilize a portion of the storage space on a buffer of the destination node to store some of the packets they have sent to the destination node.

The example medium 224 may store instructions 228 executable by the processing resource 222 to determine a second amount of packet transmission credits to allocate to the source node. The second amount of packet transmission credits may be determined based on an amount of the first amount of packet transmission credits redeemed by the source node and a congestion level of the storage space on the buffer.

For example, determining the second amount of packet transmission credits may include retrieving the second amount of packet transmission credits from a first set of values if the amount of the first amount of packet transmission credits redeemed by the source node is in an increment window relative to the first amount of packet transmission credits. That is, if the amount of the first amount of packet transmission credits redeemed by the source node is within a delta percentage from the amount of the first amount of packet transmission credits allocated to the source node, the amount of the first amount of packet transmission credits redeemed by the source node may be determined to be within an increment window. Being within the increment window may result in an increase to the first amount of packet transmission credits. The amount of the increase may be determined from a first set of values. The first set of values may include increment levels corresponding to ranges of amounts of packet transmission credits redeemed by the source node. Each increment level may correspond to a distinct and user-configurable amount of packet transmission credits and/or a percentage increase in the first amount of packet transmission credits.

Alternatively, determining the second amount of packet transmission credits may include retrieving the second amount of packet transmission credits from a second set of values when the amount of the first amount of packet transmission credits redeemed by the source node is in a decrement window relative to the first amount of packet transmission credits. That is, if the amount of the first amount of packet transmission credits redeemed by the source node is outside of a delta percentage from the amount of the first amount of packet transmission credits allocated to the source node, the amount of the first amount of packet transmission credits redeemed by the source node may be determined to be within a decrement window. Being within the decrement window may result in a decrease to the first amount of packet transmission credits allocated to the source node. The amount of the decrease may be determined from a second set of values. The second set of values may include decrement levels corresponding to ranges of amounts of packet transmission credits redeemed by the source node. The second set of values may be distinct from the first set of values. Each decrement level may correspond to a distinct and user-configurable amount of packet transmission credits and/or a percentage decrease in the first amount of packet transmission credits.

The second amount of packet transmission credits may be adjusted. For example, the second amount of packet transmission credits may be reduced based on an amount of available space at the buffer falling below a threshold amount. That is, while the increment or decrement level associated with the redeemed packet transmission credits may direct an amount to increment or decrement by, that amount may be adjusted to account for the congestion level of the storage space on the buffer. When the available storage space on the buffer falls below a threshold, for example as a result of the plurality of source nodes consuming above a threshold amount of storage space on the buffer, the amount may be reduced to account for the congested state of the buffer. The result may be a reduced second amount of packet transmission credits.

The example medium 224 may store instructions 230 executable by the processing resource 222 to adjust the second amount of packet transmission credits by an amount of the first amount of packet transmission credits not redeemed by the source node. For example, the amount of packet transmission credits redeemed by the source node may be subtracted from the first amount of packet transmission credits allocated to the source node yielding an amount of packet transmission credits not redeemed by the source. The unredeemed packet transmission credits for the source may be subtracted from the second amount of packet transmission credits yielding an adjusted second amount of packet transmission credits to be allocated from the destination node to the source node in order to replenish the packet transmission credit pool of the source up to the second amount of packet transmission credits.

The example medium 224 may store instructions 232 executable by the processing resource 222 to allocate the adjusted second amount of packet transmission credits from the destination node to the source node. Allocating the adjusted second amount of packet transmission credits from the destination node to the source node may include sending the adjusted second amount of packet transmission credits to a credit transfer manager managing credits for the plurality of source nodes. However, prior to the allocation, the adjusted second amount of packet transmission credits may be increased above a packet transmission credit baseline amount when the modified second amount of packet transmission credits is under the baseline amount of packet transmission credits assigned to the source node.

Figure 3:
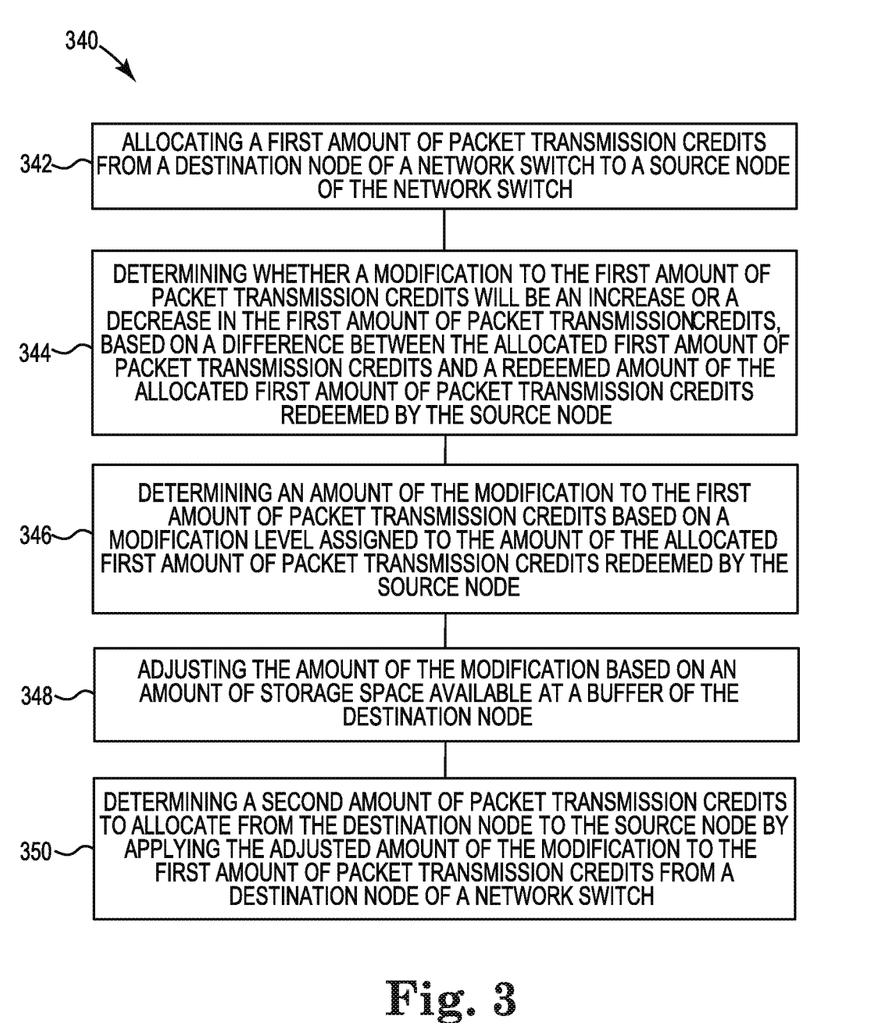
FIG. 3 illustrates a flow diagram of an example of a method for packet transmission credit allocation consistent with the disclosure.

FIG. 3 illustrates a flow diagram of an example of a method 340 for packet transmission credit allocation consistent with the disclosure. At 342, the method 340 may include allocating a first amount of packet transmission credits from a destination node of a network switch to a source node of the network switch. For example, a first quantity of packet transmission credits may be assigned to a particular source node of the plurality or source nodes. The first amount of packet transmission credits may be sent to a credit transfer manger that accumulates packet transmission credits for each of the plurality of source.

At 344, the method 340 may include determining whether a modification to the first amount of packet transmission credits should be an increase or a decrease in the first amount of packet transmission credits. The modification to the first amount of packet transmission credits may be a modification intended to be utilized in determining a second amount of packet transmission credits to allocate from the destination node to the source node in a subsequent allocation. Determining whether the modification will be an increase or a decrease to the allocated first amount of packet transmission credits may be based on a difference between the allocated first amount of packet transmission credits and a redeemed amount of the allocated first amount of packet transmission credits. That is, it may be determined whether the redeemed amount of the allocated first amount of packet transmission credits falls within an increment window or a decrement window based on how numerically distant the redeemed amount is from the allocated amount. If the redeemed amount is within a delta percentage from the allocated amount then it may be determined that the redeemed amount is within an increment window and that the modification should be an increase. If the redeemed amount is outside of a delta percentage from the allocated amount then it may be determined that he redeemed amount is within a decrement window and that the modification should be an increase.

At 346, the method 340 may include determining an amount of the modification to the first amount of packet transmission credits. The amount of the modification may be determined based on a modification level assigned to the amount of the allocated first amount of packet transmission credits redeemed by the source node. As described above, when in an increment window, a series of increment levels may be associated with potential amounts of redeemed packet transmission credits amounts. Further, when in a decrement window, a series of decrement levels may be associated with potential amounts of redeemed packet transmission credit amounts. Once it has been determined whether an amount of redeemed packet transmission credits is within an increment window or a decrement window, an increment level or a decrement level associated with the amount of redeemed packet transmission credits may be determined. The increment window or the decrement window may be associated with a user-configurable predetermined amount of packet transmission credits to modify the allocated first amount of packet transmission credits by.

At 348, the method 340 may include adjusting the amount of the modification. The amount of the modification may be scaled up or scaled down based on an amount of storage space available at a buffer of the destination node. The amount of storage space available at the buffer of the destination node may be influenced by the amount of data sent to the buffer of the destination node from the plurality of source nodes in communication with the destination node. The more storage space available at the buffer, the more credits may be issued to the source node without straining the resources. Therefore, the modification may be scaled up when the amount of storage space available is above a particular threshold. Conversely, the modification may be scaled down when the amount of storage space available is below a particular threshold indicating that the storage space available is growing scarce and/or the buffer is reaching capacity.

At 350, the method 340 may include determining a second amount of packet transmission credits to allocate from the destination node to the source node. The second amount of packet transmission credits may be determined by applying the adjusted amount of the modification to the first amount of packet transmission credits allocated to the source node from a destination node of a network switch.

The second amount of packet transmission credits may be allocated to the source node. Allocating the second amount of packet transmission credits to the source node may include transmitting an indication of the second amount of packet transmission credits to a credit transfer manager local to the source node.

When a source node wants to send a packet to the destination node, a traffic scheduler on the source node may send a request to the credit transfer manager to transfer the packet from the source node to a destination node identified in the request. The credit transfer manager may compare the amount of data associated with the packet to an amount of packet transmission credits stored at the credit transfer manager for the requesting source node from the identified destination node.

The credit transfer manager may grant permission to the traffic scheduler to transfer the packet from the source node to the destination node when the amount of packet transmission credits stored at the credit transfer manager corresponds to at least as much reserved data storage space on the buffer of the destination node as the amount of data associated with the packet. Alternatively, the credit transfer manager may deny permission to the traffic scheduler to transfer the packet from the source node to the destination node when the amount of packet transmission credits stored at the credit transfer manager does not correspond to at least as much reserved data storage space on the buffer of the destination node as the amount of data associated with the packet. In such examples, a different destination node for the packet involved in the denied transmission may be selected or the packet may be dropped at the source node when the amount of packet transmission credits stored at the credit transfer manager corresponds to less reserved data storage space on the buffer of the destination node than the amount of data associated with the packet.

The credit transfer manager may monitor an activity level of the source node. Monitoring an activity level of the source node may include monitoring the transmission of data between the source node and each of a plurality of destination nodes from which the source node has been allocated packet transmission credits. Once the source node has been idle with respect to sending data to a particular destination node for a period of time, the credit transfer manager may refund a portion of the packet transmission credits allocated to the source node by the particular destination node.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. A "plurality of" is intended to refer to more than one of such things.

The figures herein follow a numbering convention in which the first digit corresponds to the drawing figure number and the remaining digits identify an element or component in the drawing. For example, reference numeral 102 may refer to element "02" in FIG. 1. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. Further, as used herein, "a", "a number of", and/or "a plurality of" an element and/or feature can refer to one or more of such elements and/or features.

What is claimed:

1. A system comprising:
a processing resource; and
a memory resource storing instructions executable by the processing resource to:
allocate, by a destination node, a first amount of packet transmission credits to a source node;
determine, by the destination node, a modification to the first amount of packet transmission credits based on a comparison between a quantity of packet transmission credits redeemed by the source node and the first amount of packet transmission credits allocated to the source node;

adjust, by the destination node, the modification based on a condition at a buffer associated with the destination node; and apply, by the destination node, the adjusted modification to the first amount of packet transmission credits to produce a second amount of packet transmission credits to allocate to the source node;

wherein the first amount of packet transmission credits comprise a baseline amount of packet transmission credits dedicated to the source node regardless of an amount of packet transmissions.

2. The system of claim 1, wherein the baseline amount of packet transmission credits is a configurable static amount of packet transmission credits.

3. The system of claim 1, wherein the condition at the buffer is an amount of unoccupied storage space available at the buffer.

4. The system of claim 1, wherein the buffer is shared by a plurality of source nodes in communication with the destination node.

5. The system of claim 1, wherein determining the modification to the first amount of packet transmission credits further comprises comparing a quantity of packet transmission credits redeemed by the source node to a packet transmission credit threshold, wherein the packet transmission credit threshold includes a first range of quantities of redeemed packet transmission credits corresponding to a packet transmission increment window.

6. The system of claim 5, wherein the packet transmission credit threshold includes a second range of quantities of redeemed packet transmission credits corresponding to a packet transmission credit increment level within the packet transmission increment window.

7. The system of claim 5, wherein the packet transmission credit threshold includes a first range of quantities of redeemed packet transmission credits corresponding to a packet transmission decrement window.

8. The system of claim 7, wherein the packet transmission credit threshold includes a second range of quantities of redeemed packet transmission credits corresponding to a packet transmission credit decrement level within the packet transmission decrement window.

9. The system of claim 1, wherein a packet transmission credit is equal to an amount of data storable on a reserved amount of storage space on the buffer.

10. A non-transitory computer readable medium containing instructions executable by a processing resource to cause the processing resource to:

allocate, by a destination node, a first amount of packet transmission credits to a source node of a plurality of source nodes utilizing a storage space on a buffer of the destination node;

determine, by the destination node, based on an amount of the first amount of packet transmission credits redeemed by the source node and a congestion level of the storage space on the buffer, a second amount of packet transmission credits to allocate to the source node;

adjust, by the destination node, the second amount of packet transmission credits by an amount of the first amount of packet transmission credits not redeemed by the source node; and allocate, by the destination node, the adjusted second amount of packet transmission credits to the source node;

wherein the first amount of packet transmission credits comprise a baseline amount of packet transmission credits dedicated to the source node regardless of an amount of packet transmissions.

11. The non-transitory computer readable medium of claim 10, further comprising instructions executable to:

increase the adjusted second amount of packet transmission credits above a packet transmission credit baseline amount prior to allocating when the modified second amount of packet transmission credits is under the baseline amount of packet transmission credits.

12. The non-transitory computer readable medium of claim 10, wherein the instructions to determine the second amount of packet transmission credits based on the congestion level of the storage space on the buffer include instructions to:

reduce the second amount of packet transmission credits based on an amount of available storage space at the buffer falling below a threshold amount.

13. The non-transitory computer readable medium of claim 10, wherein the instructions to determine the second amount of packet transmission credits include instructions to:

retrieve the second amount of packet transmission credits from a first set of values if the amount of the first amount of packet transmission credits redeemed by the source node is in an increment window relative to the first amount of packet transmission credits; and retrieve the second amount of packet transmission credits from a second set of values when the amount of the first amount of packet transmission credits redeemed by the source node is in a decrement window relative to the first amount of packet transmission credits.

14. A method comprising:

allocating, by a destination node of a network switch, a first amount of packet transmission credits to a source node of the network switch;

determining, by the destination node, whether a modification to the first amount of packet transmission credits will be an increase or a decrease in the first amount of packet transmission credits, based on a difference between the allocated first amount of packet transmission credits and an amount of packet transmission credits redeemed by the source node;

determining, by the destination node, an amount of the modification to the first amount of packet transmission credits based on a modification level assigned to the amount of packet transmission credits redeemed by the source node;

adjusting, by the destination node, the amount of the modification based on an amount of storage space available at a buffer of the destination node; and determining, by the destination node, a second amount of packet transmission credits to allocate to the source node by applying the adjusted amount of the modification to the first amount of packet transmission credits;

wherein the first amount of packet transmission credits comprise a baseline amount of packet transmission credits dedicated to the source regardless of an amount of packet transmissions.

15. The method of claim 14, comprising:

refunding, to the destination node from the source node, the amount of the allocated first amount of packet transmission credits not redeemed by the source node after the source node has remained idle for a period of time.

16. The method of claim 14, comprising:
requesting, from a credit transfer manager local to the source node, to transfer a packet from the source node to the destination node.

17. The method of claim 16, comprising:
comparing the amount of data associated with the packet to an amount of packet transmission credits stored at the credit transfer manager for the source node.

18. The method of claim 17, comprising:
granting a permission to transfer the packet from the source node to the destination node when the amount of packet transmission credits stored at the credit transfer manager corresponds to at least as much reserved data storage space on the buffer of the destination node as the amount of data associated with the packet.

19. The method of claim 17, comprising:
dropping the packet at the source node when the amount of packet transmission credits stored at the credit transfer manager corresponds to less reserved data storage space on the buffer of the destination node than the amount of data associated with the packet.

\* \* \* \* \*